No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 1.

WITNESSES:
L. F. Browning
W. A. Stahlen

INVENTOR
Joseph N. Mahoney
BY
Baldwin, Davidson & Wight
ATTORNEYS

No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 2.

WITNESSES:
L. F. Browning
W. A. Stahlin

INVENTOR
Joseph N. Mahoney
BY
Baldwin, Davidson & Wight
ATTORNEYS

No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 3.

WITNESSES:
L. F. Browning
W. A. Stahlin

INVENTOR
Joseph N. Mahoney
BY
Baldwin, Davidson & Wight
ATTORNEYS

No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 4.

WITNESSES:
L. L. Browning
W. A. Stahln

INVENTOR
Joseph N. Mahoney
BY
Baldwin, Davidson & Wight
ATTORNEYS.

No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 6.

No. 776,526. PATENTED DEC. 6, 1904.
J. N. MAHONEY.
ELECTRIC BRAKE FOR VEHICLES.
APPLICATION FILED JAN. 21, 1904.
NO MODEL. 8 SHEETS—SHEET 8.

WITNESSES:
INVENTOR
Joseph N. Mahoney
Baldwin, Davidson & Wright
ATTORNEYS

No. 776,526.　　　　　　　　　　　　　　　　　　　　Patented December 6, 1904.

UNITED STATES PATENT OFFICE.

JOSEPH N. MAHONEY, OF BROOKLYN, NEW YORK, ASSIGNOR TO AMERICAN ELECTRIC BRAKE COMPANY, OF NEW YORK, N. Y., A CORPORATION OF NEW JERSEY.

ELECTRIC BRAKE FOR VEHICLES.

SPECIFICATION forming part of Letters Patent No. 776,526, dated December 6, 1904.

Application filed January 21, 1904. Serial No. 190,061. (No model.)

*To all whom it may concern:*

Be it known that I, JOSEPH N. MAHONEY, a citizen of the United States, residing in the borough of Brooklyn, county of Kings, State of New York, have invented certain new and useful Improvements in Electric Brakes for Vehicles, of which the following is a specification.

This invention relates to improvements in electric brake apparatus in which the energy for operation is supplied by the momentum of the vehicle or by an independent source to electromagnetic brake-operating apparatus acting on friction-surfaces for the purpose of retarding the motion of and bringing the vehicle to rest.

The objects of the improvements are, first, to provide automatic means for obtaining increased efficiency; second, to reduce the energy taken from the momentum-driven generators; third, to perfect and simplify the apparatus.

I attain these objects by an organization of mechanism and circuits hereinafter described, and illustrated in the accompanying drawings, in which—

Figs. 2 to 9, inclusive, are diagrams showing in sequence the various conditions or connections of the different pieces of apparatus corresponding with the various positions of the brake-switch, reversing-switch, power-switch, and transfer-switch indicated in Fig. 1.

The reference-letters indicating the main parts of the apparatus in a general way are as follows: T, trolley-conductor or main; PS, power-switch or controller; RS, reverse-switch; BS, brake-switch or controller; M' and $M^2$, the motors; PR, power resistance; A', armature of motor M'; $A^2$, armature of motor $M^2$; F', field-coil of motor M'; $F^2$, field-coil of motor $M^2$; I, brake-switch-locking device; A, automatic controller of braking system; AC and AL, Figs. 1 and 10, operating-coils of automatic controller; AS, spring-opposing action of operating-coils of autocontroller; AR, brake resistance regulated by autocontroller; TS, transfer-switch; TC, coil operating transfer-switch; M, plunger or core of brake-operating magnet; RC, release-coil; S' $S^2$, shunts for controlling the action of autocontroller.

The several resistances perform functions usual to them and are of ordinary construction. The power-switch and reversing-switch are of any ordinary suitable type, and the brake-switch BS may be mechanically of similar construction, and all these parts are therefore merely shown diagrammatically, as in Fig. 1.

Locking device I is the same as that disclosed in my Patent No. 665,450, dated January 8, 1901, reissued March 10, 1903, No. 12,098.

Figure 1:
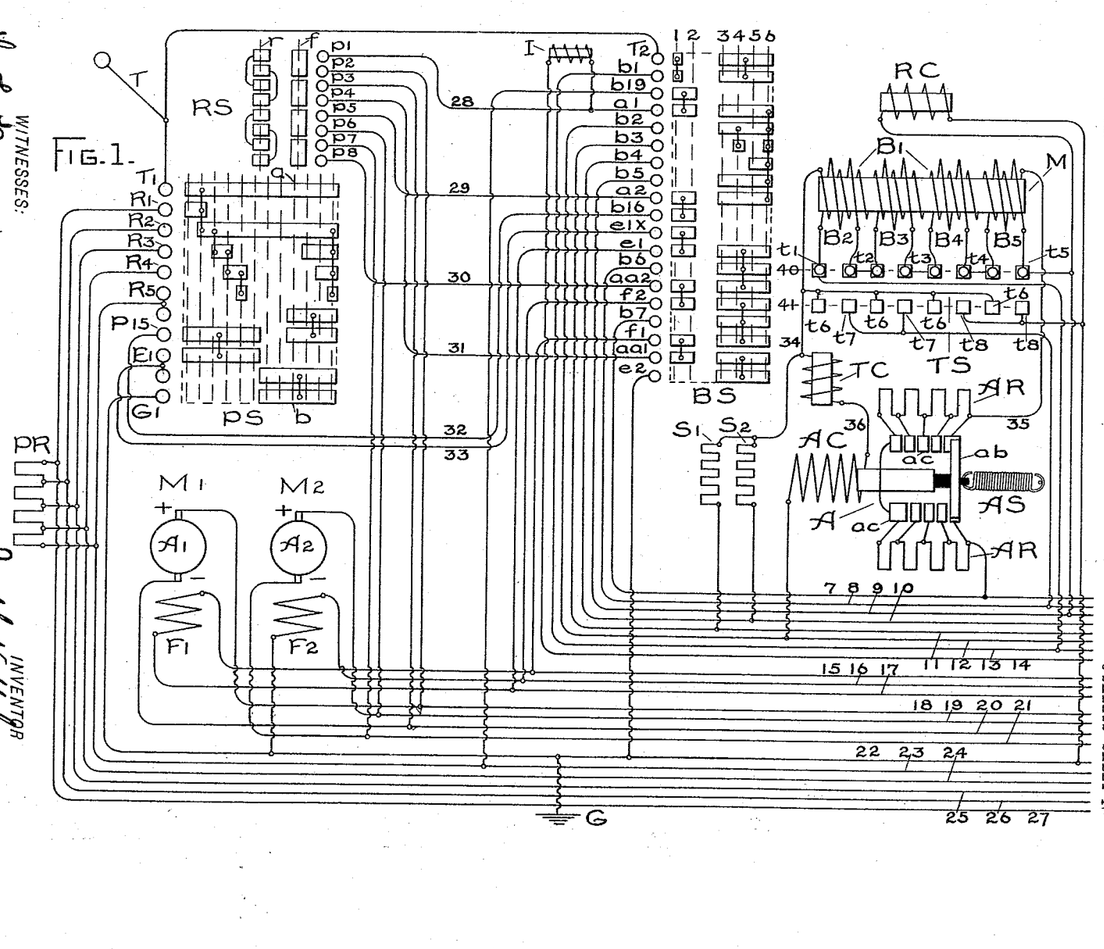
Figure 1 is a diagrammatic view indicating the several pieces of apparatus mounted on a car and their various circuit connections.

The release-coil cylinder RC may be of the same construction as the main brake-operating cylinder D (illustrated in Fig. 15) and serves the purpose of releasing the shoes when the brake-switch is in the position marked 1, Fig. 1, and in positions 3, 4, 5, and 6 of the brake-switch it is also active and holds the retaining or locking mechanism on the brake-magnet out of engagement while the energy active in the brake-magnet and the brake-pressure resulting therefrom is above a predetermined amount, thus preventing locking and consequent sliding of the wheels, which would greatly reduce obtainable retardation.

The transfer-switch TS (shown in Fig. 1) is a piece of apparatus for transferring the circuit through the coils $B^2$ $B^3$ $B^4$ $B^5$ of the brake-magnet, which are in series in the trolley-circuit, to the circuits of the motors when the latter are operating as generators, the coils $B^2$ and $B^3$ being then placed in parallel across the terminals of the armature $A^2$ and coils $B^4$ and $B^5$ in parallel across the terminals of the armature $A'$.

Figure 10:
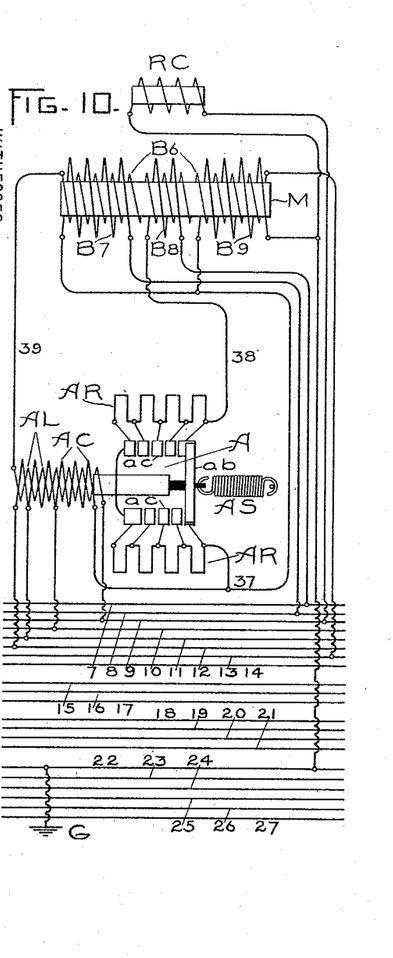
Fig. 10 is a diagrammatic view indicating an equivalent organization of brake apparatus and circuits producing like results with less apparatus than is shown in Fig. 1.

The automatic controller A consists of an operating coil or cylinder AC, as in Fig. 1, or AC and AL, as in Fig. 10, (and may be similar in construction to the main brake-magnet D,) acting against the spring AS to operate the contact-bar $ab$ across the regulating-contacts $ac$ of the resistance AR to regulate current passing through the coil $B'$ of the brake-magnet, which is in series with the parallel field-coils $F'$ and $F^2$ of the motors $M'$ and $M^2$ to control the total output of the motor-armatures $A'$ and $A^2$ used throughout the braking operation, thereby making it possible to regulate the several braking actions in a definite ratio to the speed of the vehicle. The shunts $S'$ and $S^2$ act to raise or lower the maximum energy in the braking-circuits controlled by the automatic controller A by shunting predetermined portions of the current from the winding AC. In Fig. 10 the same effect is produced by cutting out portions of the winding AC, thereby causing the energy to increase in the brake-circuits as a whole to obtain a like regulating effect in the automatic controller A.

In Fig. 10 the absence of the transfer-switch TS will be noted.

To accomplish the desirable feature of limiting the trolley-current in the coil $B^6$, Fig. 10, as long as the motors are capable of supplying the necessary energy to the braking-circuits, the circuit connections are arranged so that the voltage generated by the motor-armatures opposes the trolley current or voltage in the circuit of the coil $B^6$ and may be adjusted to equal the same, and thus neutralize the trolley-voltage, and so eliminate the trolley-current through a considerable portion of the braking operation.

In Fig. 10 by the action of the brake-switch BS in all of its braking positions the coil $B^7$ of the brake-magnet M is placed across the terminals of the armature $A^2$ and coil $B^9$ across the terminals of the armature $A'$, the current passing in both coils $B^7$ and $B^9$ passing also through the coil AC of the autocontroller A. The coil $B'$, Fig. 1, or the coil $B^8$, Fig. 10, is in series in the circuit of both motor-fields, which are in parallel, and the current passing through the coil also passes through coil AC of the automatic controller and the resistance AR. This is for the purpose of assisting the automatic controller by reason of the self-induction of the coil $B'$ or $B^8$ to regulate the rapidly-varying currents due to varying speed during a braking operation. Thus the relatively large braking-current and incidental braking operation are controlled by the automatic regulation of the small current present in the motor-fields. When (as at low and intermediate speeds or for any reason) the relative voltage of trolley-current and current from the motors is such that trolley-current is present and available in coil $B^6$ for or to assist the braking operation, the current delivered by the motors to the brake-coils $B^7$ $B^8$ $B^9$ should be correspondingly kept down, as otherwise the braking action of the total current in the several brake-coils $B^6$ $B^7$ $B^8$ $B^9$ would be excessive. The coil AL, Fig. 10, in the trolley-circuit with $B^6$ is therefore arranged to assist the coil AC of the automatic controller to regulate the current delivered by the motors, the control being such as to cause increase of current delivered by the motors as the trolley-current in A and $B^6$ diminishes or ceases.

Figure 2:
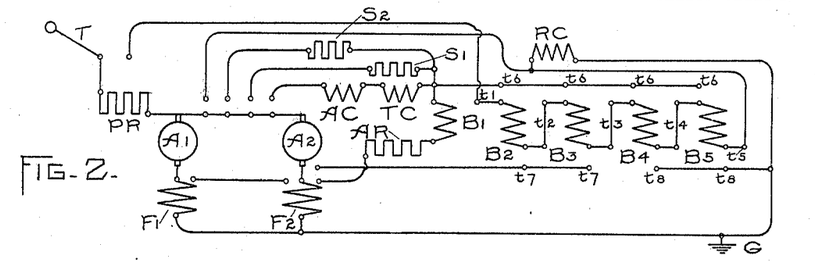

Referring to Fig. 1 and assuming that the reverse-switch RS is in the position $f$, the power-switch in position $ab$, or first multiple position, and the brake-switch BS in position 2, which is the running position, the circuit connections will be as shown in Fig. 2, and current from the trolley T will be supplied to the motors $M'$ and $M^2$ for the forward movement of the car. The circuit is from the conductor T, brush $T'$, contact plates and brush $R^2$ of power-switch PS, wire 26, through resistance PR, wire 23 to brush $b^{19}$, contact plates and brush $a'$ of brake-switch BS, wire 28, brush $p'$, contact plate and brush $p^2$ of reverse-switch, wire 18 to positive terminal of armature $A'$, from negative terminal of armature $A'$, wire 20, brush $p^3$, contact-plate, brush $p^4$ of RS, wire 31, brush $aa'$, contact plates and brush $f'$ of BS, wire 15, through field-coil $F'$, wire 17, brush $e'$, contact plates and brush $e'^{\times}$ of BS, wire 33, brush $E'$, contact plates and brush $G'$ of PS, wire 22 to ground G, completing the circuit for motor $M'$. The circuit is also from resistance PR, wire 23, brush $R^5$, contact plates and brush $P^{15}$ of PS, wire 32, brush $b^{16}$, contact plates and brush $a^2$ of BS, wire 29, brush $p^5$, contact plate and brush $p^6$ of RS, wire 19 to positive terminal of armature $A^2$, negative terminal of armature $A^2$, wire 21, brush $p^7$, contact plate and brush $p^8$ of RS, wire 30, brush $aa^2$ of BS, contact plates and brush $f^2$ of BS, wire 16, through field-coil $F^2$, through wire 22 to ground G, completing circuit of motor $M^2$.

Figure 3:
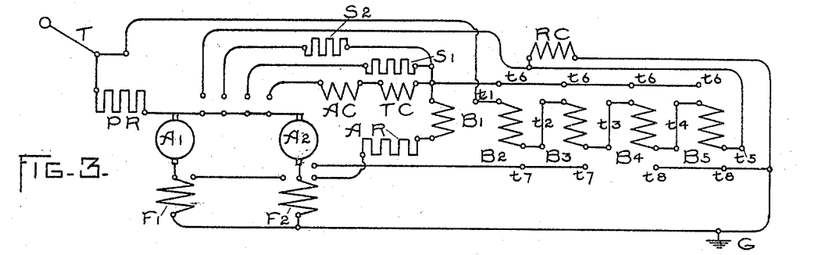

Fig. 3 illustrates the circuit connections when the brake-switch BS, Fig. 1, is moved to position 1 or release position, all other connections remaining as in Fig. 2. The newly-established circuit is from the conductor T to brush $T^2$, contact plates and brush $b'$ of BS, wire 13, contact $t'$ of TS, coil $B^2$ of brake-magnet M, contacts $t^2$ of TS, coil $B^3$ of M, contacts $t^3$ of TS, coil $B^4$ of M, contacts $t^4$ of TS, coil $B^5$ to contact $t^5$ of TS, by wire 9 through release-coil RC, by wire 22 to ground G, completing a circuit passing trolley - current through the release-cylinder for releasing the pressure on the brake-shoes, the same small current passing through the several coils of the brake-magnet M serving to retard the too rapid release of brake-pressure and consequent jar resulting therefrom.

Figure 4:
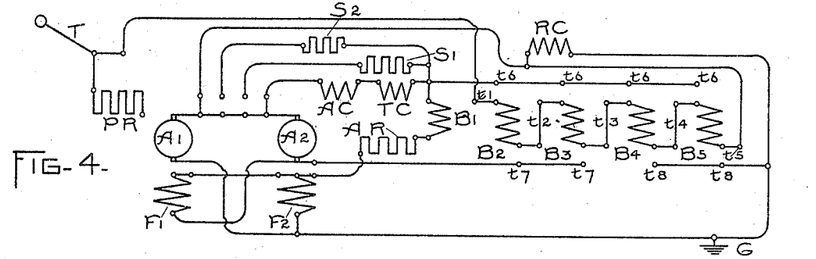

Fig. 4 illustrates the circuit connections when the brake-switch BS, Fig. 1, is in position 3, or first braking position, power-switch PS and reverse-switch RS remaining as in Fig. 2 and contacts of transfer-switch TS being in the position indicated by line 40. The circuit connections of armature $A'$ supplying the brake apparatus are as follows: from positive terminal of armature $A'$ to wire 18, brush $p^2$, contact plate and brush $p'$ of RS, wire 28, brush $a'$, contact plates and brush $b^2$ of BS, wire 12, through coil AC of autocontroller A, wire 36, through coil TC of transfer-switch TS, wire 34, through coil $B'$ of brake-magnet M, wire 35, through resistance AR, contacts $ac$, and contact-bar $ab$ of autocontroller A, wire 7, to brush $b^7$, contact plates and brush $f^2$ of BS, wire 16, through field-coil $F^2$, wire 22, brush $e^2$, contact plates and brush $aa'$ of BS, wire 31, brush $p^4$, contact plates and brush $p^3$ of RS, wire 20, to negative terminal of armature $A'$. Circuit of armature $A^2$ is as follows: from positive terminal of $A^2$, wire 19, brush $p^6$, contact plate and brush $p^5$ of RS, wire 29, brush $a^2$, contact plates and brush $b^2$ of BS, wire 12, through coil AC of autocontroller A, wire 36, coil TC of transfer-switch TS, wire 34, through coil $B'$ of brake-magnet M, wire 35, through resistance AR, contacts $ac$, and contact-bar $ab$ of autocontroller A, wire 7, brush $b^7$, contact plates and brush $f'$ of BS, wire 15, through coil $F'$, wire 17, brush $e'$, contact plates and brush $aa^2$ of BS, wire 30, brush $p^8$, contact plates and brush $p^7$ of RS, wire 21 to negative terminal of armature $A^2$. The circuit connections established are such that the energy for exciting the field of one motor comes from the armature of the other motor, and therefore compels them to generate in the same direction and each deliver an equal amount of energy to the brake-circuits.

The circuit connections in Fig. 4 supplying trolley-current to the brake apparatus are from the trolley-conductor T, brush $T^2$, contact plates and brush $b'$ of BS, wire 13, contacts $t'$, $t^2$, $t^3$, $t^4$, and $t^5$ of TS, through coils $B^2$, $B^3$, $B^4$, and $B^5$ of magnet M, wire 9, brush $b^5$, contact plates and brush $a'$ of BS, wire 28, brush $p'$, contact plate and brush $p^2$ of RS, wire 18, through armature $A'$, wire 20, brush $p^3$, contact plate and brush $p^4$ of RS, wire 31, brush $aa'$, contact plates and brush $e^2$ of BS, wire 22 to ground G. The circuit connections of the release-cylinder RS first occurring in this position of the brake-switch BS for the purpose of holding out of action the retaining mechanism when the energy in the brake-circuits is above a predetermined amount are as follows: contact plate and brush $b^5$ of BS, wire 9, through release-coil RC to wire 22, placing the release-coil RC in shunt to armature $A'$.

Figure 5:
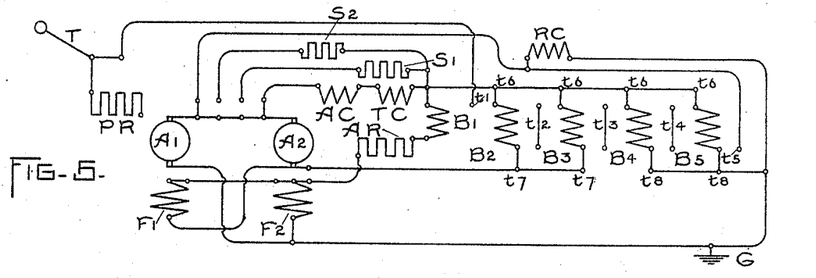

Fig. 5 illustrates the circuit connections when all conditions are the same as in Fig. 4, with the exception that owing to a predetermined rise of current from the motors in the coil TC of the transfer-switch TS the contacts of the transfer-switch have assumed the position indicated by line 41, thereby cutting off the supply of trolley-current from the coils $B^2$, $B^3$, $B^4$, and $B^5$ of the brake-magnet M and placing the coils $B^2$ and $B^3$ in parallel across the terminals of the armature $A^2$ and coils $B^4$ and $B^5$ in parallel across the terminals of the armature $A'$. The circuit for the coils $B^2$ and $B^3$ is as follows: from wire 34, contacts $t^6$ and $t^7$ of TS, through coils $B^2$ and $B^3$ of brake-magnet M, wire 8, brush $b^6$, contact plates and brush $aa^2$ of BS, wire 30, brush $p^8$, contact plate and brush $p^7$ of RS, wire 21 to negative terminal of armature $A^2$. The circuit of the coils $B^4$ and $B^5$ is as follows: wire 34, contacts $t^6$ and $t^8$ of TS, through coils $B^4$ and $B^5$ of M, wire 22, brush $e^2$, contact plates and brush $aa'$ of BS, wire 31, brush $p^4$, contact plate and brush $p^3$ of RS, wire 20 to negative-terminal armature $A'$. The energy passing through coils $B^2$ $B^3$ $B^4$ $B^5$ has already passed through the actuating-coil AC of the autocontroller A. Therefore such energy is controlled by means of the regulating action of the coil AC through the medium of the resistance AR on the small energy in the field-circuits.

Figure 6:
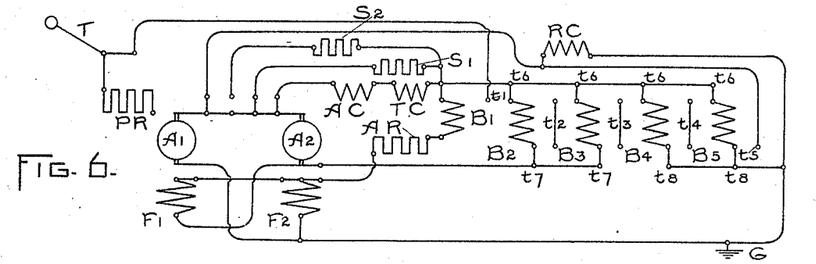

Fig. 6 illustrates the circuit connections when the brake-switch BS has been moved to the position 4, Fig. 1, all other conditions remaining the same as in Fig. 5, with the exception that the shunt resistance $S'$ is placed across the coils AC and TC for the purpose of raising the current in the brake-circuit, thereby increasing the braking action a given amount. The immediate effect of placing the shunt $S'$ around the coil AC is to weaken that coil, so that the reaction of its spring AS effects a cutting out of resistance in both field-circuits, thereby causing delivery of a heavier current from the armature to the brake-circuits, whereupon an increasing current then traverses the coil AC, which automatically regulates the braking operation, as in Fig. 5.

Figure 7:
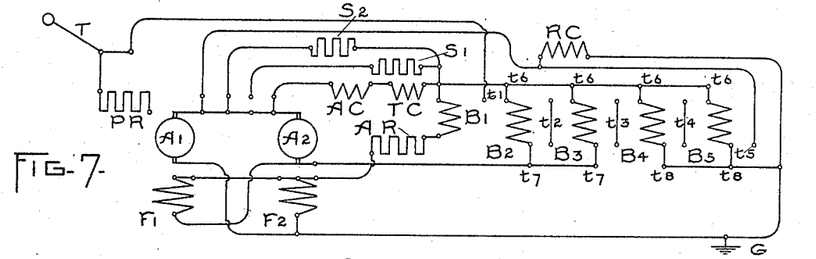

Fig. 7 illustrates circuit connections when the brake-switch has been moved to the position 5, Fig. 1, all conditions remaining, as in Fig. 5, with the exception that the shunt $S^2$ of lower resistance than $S'$ is placed across the coils AC and TC, the shunt $S'$ being cut out. The circuit of the shunt $S'$ is as follows: contact plate and brush $b^3$ of BS, wire 11 through shunt $S'$ to wire 34. The circuit of the shunt $S^2$ is as follows: contact plate and brush $b^4$ of the brake-switch BS, wire 10, through $S^2$ to wire 34.

Figure 8:
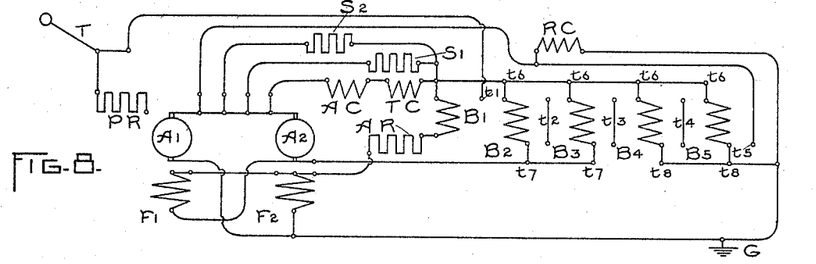

Fig. 8 illustrates the circuit connections when the brake-switch has been moved to the position 6, Fig. 1, all conditions remaining as in Fig. 5, with the exception that both shunt resistances $S'$ and $S^2$ are placed in multiple across the coils AC and TC in the same manner that they are so placed individually in Figs. 6 and 7.

Fig. 9 illustrates the circuit connections, where all conditions are the same as in Fig. 8, with the exception that the reverse-switch RS, Fig. 1, is in the position indicated by the line $r$—that is, in the position which if the motors were being driven by trolley-current would tend by reversal of the motors to drive the car in the opposite direction. The motors are, however, in the diagrams shown at this time as acting as generators driven by the momentum of the car. This condition is sometimes brought about by the action of the motorman in a moment of excitement in an emergency. In all other electric braking systems known to me using the motors as generators such action by the motorman would render the braking system or operation entirely inoperative by reversing and nullifying the field excitation of the motors which are then acting as generators. In this system the circuit connections established under these conditions are as follows: from positive terminal of armature $A'$, wire 18, brush $p^2$, contact plates and brush $p^4$ of RS, wire 31, brush $aa'$, contact plates and brush $e^2$ of BS, wire 22, through field-coil $F^2$, wire 16, brush $f^2$, contact plates and brush $f'$ of BS, wire 15, through field-coil F, wire 17, brush $e'$, contact plates and brushes $aa^2$ of BS, wire 30, brush $p^8$, contact plates and brush $p^6$ of RS, wire 19 to positive terminal of armature $A^2$, negative terminal of armature $A^2$, wire 21, brush $p^7$, contact plates and brush $p^5$ of RS, wire 29, brush $a^3$, contact plates and brush $a'$ of BS, wire 28, brush $p'$, contact plates and brush $p^3$ of RS, wire 20, and to negative terminal of armature $A'$, forming the circuit indicated by the single-headed arrows, Fig. 9. This relation of armatures and field-coils so established is similar to the operation of two series-wound generators in multiple without equalizing connections, the result being that they operate in series in a circuit containing only their own internal resistance, and therefore act very effectively at speeds down to the lowest. A further feature of this system is that by reason of brake-coils being coupled in shunt to each armature they are still effective for making a highly-efficient stop. The circuits through the brake apparatus are indicated by the double-headed arrows in Fig. 9.

Figure 11:
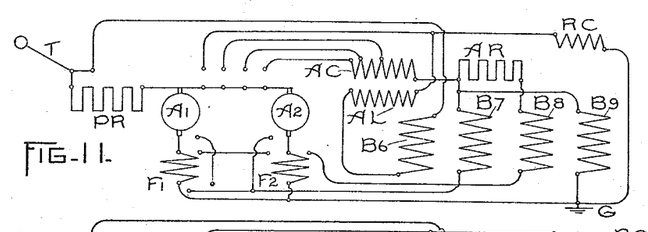
Figs. 11, 12, 13, and 14 show in sequence the various conditions and connections of the different pieces of apparatus illustrated in Fig. 10 corresponding to the various positions indicated in Fig. 1.

Fig. 11 illustrates the circuit connections when the brake-switch, Fig. 1, is moved to position 1 or release position, all connections remaining as in Fig. 2 with the exception that the brake apparatus is shown as constructed and arranged in Fig. 10. The newly-arranged circuit of the release-cylinder is as follows: wire 13, Figs. 1 and 10, through coil $B^6$ of brake-magnet M, Fig. 10, wire 39, through coil AL of autocontroller A, Fig. 10, wire 9, through coil RC of Fig. 10, wire 22, to ground G.

Figure 12:
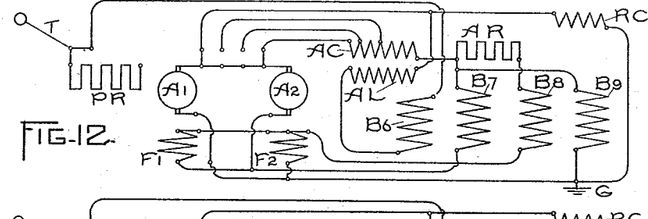

Fig. 12 illustrates the circuit connections that ensue when the brake-switch BS, Fig. 1, is in the position 3 or first braking position, power-switch PS and reverse-switch RS remaining as in Fig. 2 and the brake apparatus being arranged as in Fig. 10. The relation of the motor connections being the same as in Fig. 5, it will only be necessary to follow the newly-arranged brake-circuits in Fig. 10 as follows: from wire 12, through coil AC of autocontroller A, wire 37, through resistance AR, contacts $ac$ and contact-bar $ab$ of the autocontroller A, wire 38, through coil $B^8$ of brake-magnet M, wire 7, and thence through field-coils, &c., as in Fig. 5, also from wire 37, through coil $B^7$ of brake-magnet M, wire 8 to armature $A^2$, as in Fig. 5, also from wire 37 through coil $B^9$ of brake-magnet M, wire 22, to armature $A'$, as in Fig. 5. The circuit connections supplying trolley-current to the brake apparatus are as in Fig. 5, the newly-arranged circuits as shown in Fig. 10 being as follows: from wire 13 through coil $B^6$ of brake-magnet M, wire 39, coil AL of autocontroller A, wire 9, and thence as in Fig. 5. The circuit connections of the release-cylinder are as in Fig. 5.

Figures 13, 14:
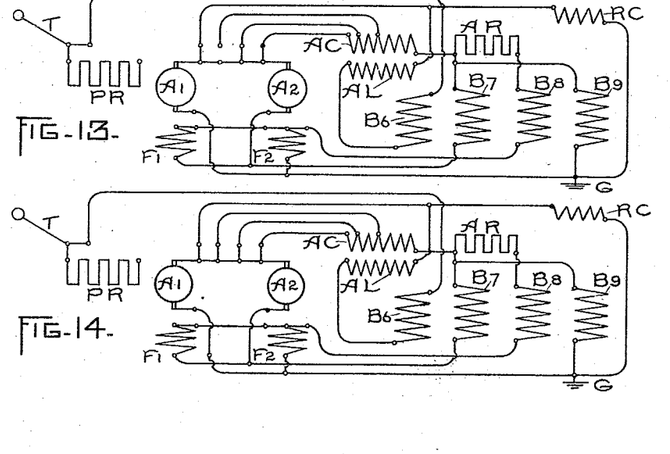

Figs. 13 and 14 are identical with Fig. 12 with the exception that portions of the coil AC of the autocontroller A are cut out in the fourth and fifth positions of the brake-switch by being directly connected to the wires 11 and 10, respectively, of Fig. 10 and Fig. 1. This produces a similar effect to the shunts $S'$ $S^2$. (Shown in Figs. 1 to 9, inclusive.)

Figure 19:
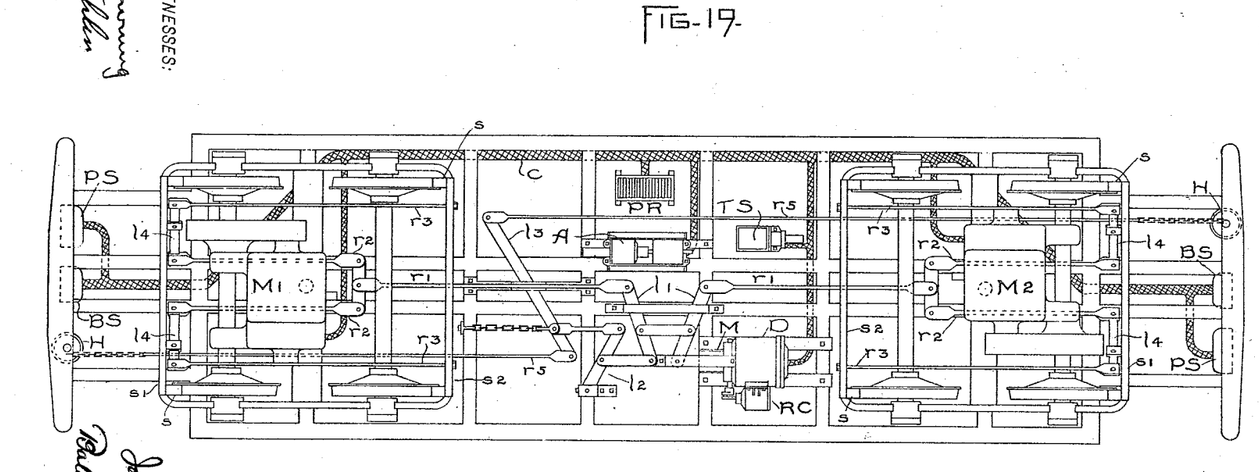
Fig. 19 is a plan view of a car with the body and platform removed, indicating the frame, trucks, motors, brake-shoes, brake-gear, &c., of ordinary construction with my improvements applied thereto.

The general arrangement of circuits and the behavior of the different pieces of apparatus having now been indicated, the construction of the apparatus will be described in detail. The various pieces of apparatus may be mounted on the car frame and trucks, as indicated in Fig. 19, which also shows the cable C, carrying the conductors already described.

$l'$ shows an equalizing system of brake-levers for transferring the pull of the plunger M of the electromagnetic brake-cylinder D to the brake-rods $r'$, connected to rods $r^2$, joined to levers $l^4$ on both trucks. These levers distribute the brake-pressure to the brake-shoes $s$ by means of rods $r^3$ and brake-shoe beams $s'$ and $s^2$.

H indicates the hand-wheel of the manually-actuated brake that operates on the system of levers $l'$ through the medium of rods $r^5$ and levers $l^3$ $l^2$.

What has been termed the "magnetic brake-cylinder" is, in fact, an electromagnet of novel construction especially designed for this work and is constructed as follows: It consists, Fig. 15, of an outer cylindrical body D of iron or steel, within which are disposed the several coils surrounding the core or plunger M. The back head J of the outer cylindrical body is provided with an inwardly-projecting cylindrical hollow pole-piece K, which may be made, as indicated, of an independent piece of metal having magnetic qualities superior to the head J. A tube Z, of non-magnetic metal, extends from the inner end of the pole-piece K to the front wall of the cylinder D and assists in guiding the plunger M and also serves to protect the coils from mechanical injury. The bore of the hollow pole-piece K is of the shape of the frustum of a cone, its smaller diameter being at the outer end. The plunger M consists of a cylindrical part with a flat upper face and having its bearing in the tube Z and the cylindrical bore in the front portion of the cylinder D and also of a conical part of the same degree of taper as that of the bore of the pole-piece K, but of greater length. The purpose of the novel shape and relative proportions of this part of the plunger M and the bore of the pole-piece K is to decrease the area of the air-gap relative to the decreasing length of the air-gap as the plunger M travels inwardly. This is accomplished by allowing the tapered portion of the plunger M to extend beyond the outer or smaller end of the bore of the pole-piece K, thus tending to maintain a constant reluctance in the magnetic circuit, and consequently a constant pull throughout the travel of the plunger M. This proportion also increases the general efficiency of this form of apparatus by increasing the area of the air-gap relative to the cross-sectional area of the plunger M. On the front end of the plunger is the jaw O, with pin U, by which the pull of the plunger is transmitted to the brake-gear.

Figures 15, 16:
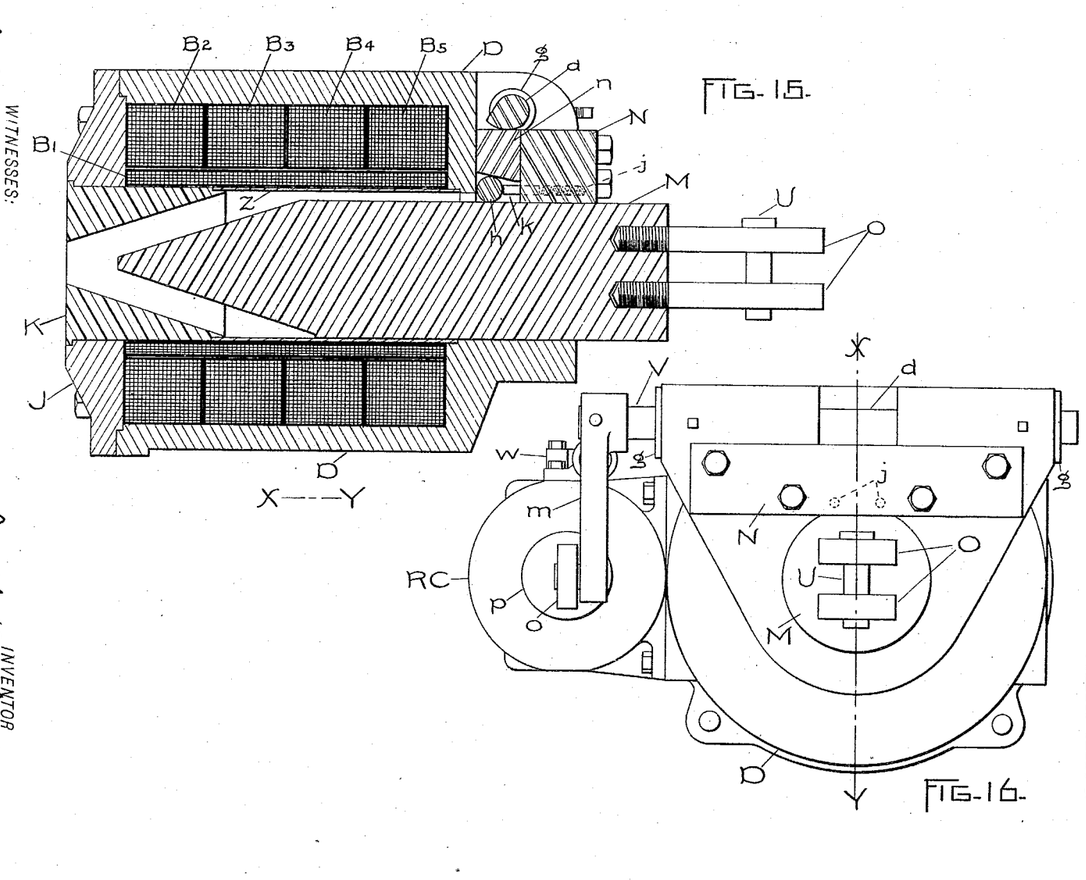
Fig. 15 is a view in vertical section, on the line X Y of Fig. 16, of the improved brake-operating apparatus complete with a set of coils, as in Fig. 1, by which the brake-shoes are applied to the wheels, and a retaining mechanism for holding the brake-shoe pressure against the wheels.
Fig. 16 is a front elevation of the same, showing the mechanism for releasing the retained brake-pressure.

On the flattened upper surface of the plunger M bears the roller $h$, upon which rests the wedge-block $n$, and on this block bears the cam $d$, mounted on the cam-shaft V, that rotates in bushings $g$, Fig. 16. On the cam-shaft V is fastened lever $m$, Fig. 17, against which bears a plug $q$, mounted in a case $v$ and acted upon by spring $u$, which may be adjusted by screw $x$ in the head or bar $w$. This constitutes the retaining or locking mechanism and acts as follows: Upon cessation of current in the coils surrounding the plunger M the strain on the brake-gear will tend to retract the plunger; but this is prevented by the roll $h$ moving forward slightly and binding the plunger M by its wedge-like action between the flattened surface of M and the lower surface of $n$, which latter is prevented from lifting by cam $d$, maintained in intimate contact with it by the spring $u$, Fig. 17.

Figures 17, 18:
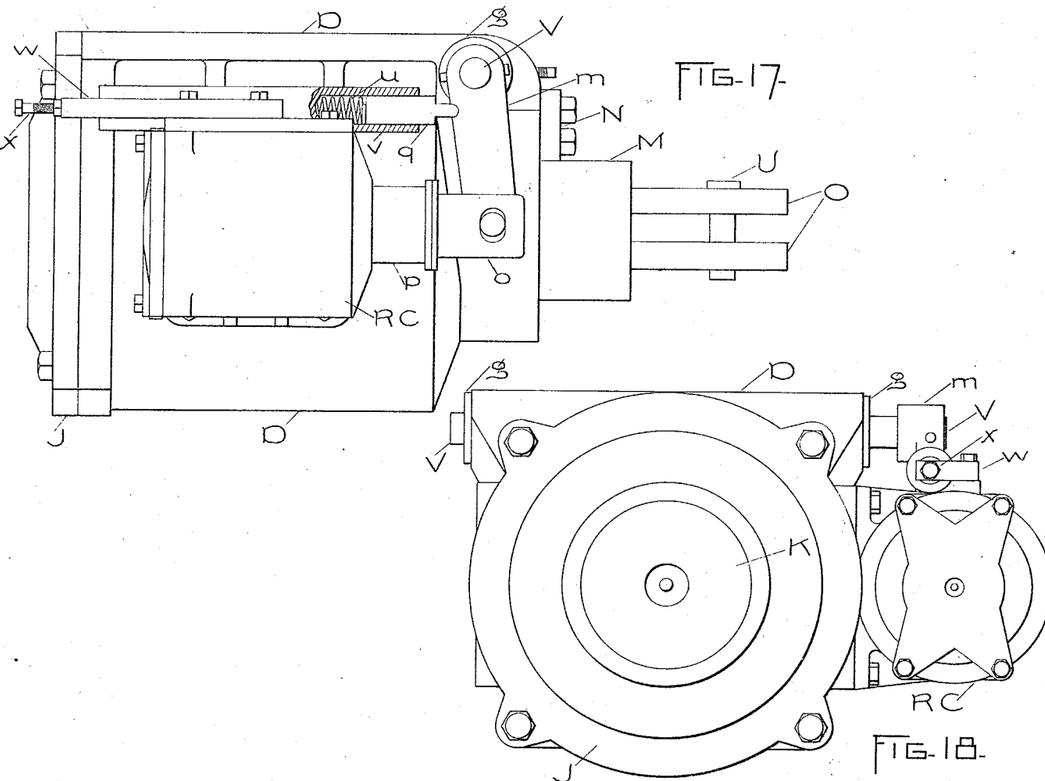
Figs. 17 and 18 are a side and end elevation, respectively, illustrating retaining and releasing mechanism in greater detail.

The releasing or unlocking operation is as follows: On passage of current through the winding of the release-magnet RC, which may be of the same general construction as the brake-magnet on the frame of which it is mounted, the plunger $p$ is drawn in, and through the connecting-bar $o$ and lever $m$ the spring $u$ is compressed and cam-shaft $v$ is rotated, lifting cam $d$, releasing pressure on the roll $h$, and allowing the springs $j$, through the medium of the rods $k$, to throw the roll $h$ rearwardly, thereby allowing the plunger M to be retracted to release the brake-pressure established by the strain on the brake-gear. The part N is for the purpose of maintaining the parts M, $n$, $h$, $k$, and $j$ in position and alinement. On completion of the releasing operation the various parts of the locking and releasing mechanism resume their normal positions, as indicated in Figs. 15, 16, and 17.

The transfer-switch TS (the cylinder of which may be similar in construction to the brake-cylinder) consists of an operating-magnet acting in opposition to a spring to actuate a switching mechanism that may be similar in construction and arrangement to the power-switch, but of smaller size.

The automatic controller A consists of an operating-cylinder opposed by a spring and the construction of which may be similar to that of the brake-cylinder. It operates movable contacts that control the amount of resistance or the current passing in the several circuits already described. The normal position of the contacts is as indicated in A, Figs. 1 and 10, the resistance AR being completely cut out, reducing the resistance of the circuit to a minimum and compelling the motors M' and M² to generate at very low speeds. As the contacts and resistances need be of a capacity sufficient only to handle the field-exciting currents, which is but a small part of the output of the motor-armatures in braking, it is preferable that they be combined in one piece of apparatus, as indicated.

The brake-switch BS may be of a mechanical construction similar to that of the power-switch PS, which is of ordinary form. The motors M' and M² are series-wound direct-current motors, such as are ordinarily used for vehicle propulsion. The resistance PR is also of ordinary construction.

Figure 20:
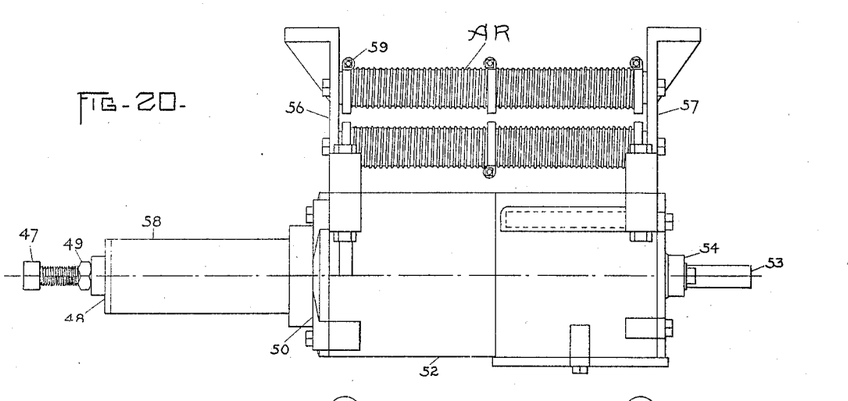
Figs. 20, 21, and 22 are respectively a side view, horizontal section, and end view showing a modification of the automatic controller A indicated in Figs. 1 and 10.
Figure 21:
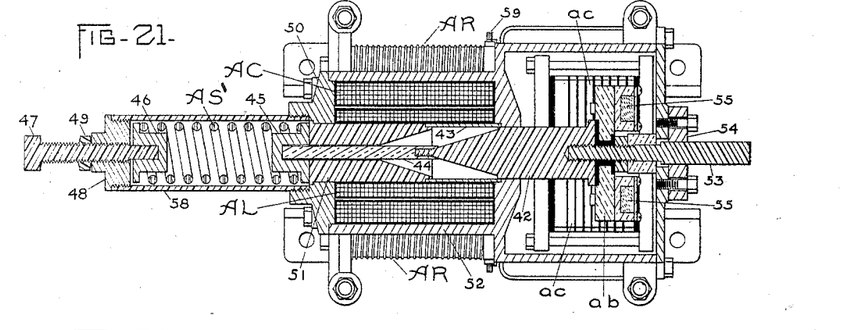
Figure 22:
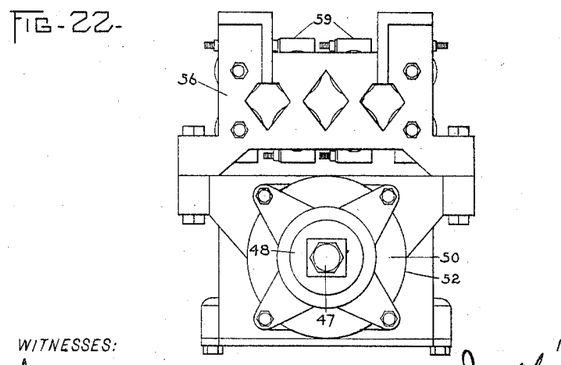

Figs. 20, 21, and 22 illustrate a side view, horizontal section, and end view of a modified construction of the automatic controller A, Figs. 1 and 10. The construction and operation of this apparatus is as follows: On passage of current through coils AC and AL, contained in the case 52, plunger 42, sliding in the non-magnetic tube 43, is attracted toward the pole-piece 51 (which is set in the head 50) and compresses spring AS' in tube 58 by means of the non-magnetic rod 44, thrusting against the bushing 45. The apparatus is adjusted for various operating-currents by means of various initial compressions on the spring AS', obtained by screw 47, mounted in cap 48, thrusting against bushing 46 and locked by nut 49. On the rod 53 of the plunger 42, but insulated therefrom, is the cross-bar $ab$, on which are mounted the brushes 55, that slide on contacts $ac$, connected by wires to clamps 59 of the resistance AR, which is mounted in frame 56. Reciprocating movement of the plunger cuts in and out sections of the resistance $Ar$, which is included in the field-circuit of the momentum-driven brake-generators, as already explained.

In this braking system the object is to vary the pressure between the braking-surfaces in such relation to the character of the material of which the braking-surfaces are composed, the load on the generators, and the element of time during which the braking operation is effected that a uniform or substantially uniform rate of retardation is obtained throughout the whole or substantially the whole of the stop. This result is primarily obtained by the action of the automatic controller, which regulates the current in the armature-circuit of the generator and brake apparatus by varying the current in the field-circuit, which field-circuit has been placed in shunt to the armature during the braking operation. The motor is, however, of the ordinary type of series-wound motors usually used in propulsion of vehicles. As is well understood, at low speed the generator or generators may not deliver current enough to satisfactorily effect the braking operation, and in the organization shown the stops in such cases may be made substantially wholly with the trolley-current. The organization shown in Fig. 10, in which the trolley is permanently connected with a winding of the electromagnetic brake apparatus and also with a winding of the automatic controller, has been adopted largely because it is one that eliminates varies pieces of apparatus or styles of contacts that might by derangement become a disturbing factor in the practical operation of the system. When the system is organized, however, as shown in Fig. 10, the braking operation in stops other than those made at low speeds is accomplished almost wholly by energy from the generator or generators, the trolley-current then present in any of the circuits of the system being substantially or wholly neutralized by current from the generator. On the other hand, when stops are made at such low speeds the generator does not deliver a current of sufficient strength to alone satisfactorily effect the braking operation. The voltage of the generator-current is not then sufficient to materially oppose or neutralize the trolley-current present, and the latter current therefore accomplishes the braking operation.

I claim as my invention—

1. In an electric braking system, the combination of a propelling-motor adapted to be driven as a generator by the momentum of the vehicle, its armature-circuit, electromagnetic brake apparatus included therein, another circuit including the field and means for automatically varying the current in the circuit including the field as the speed of the vehicle varies to control the current in the electromagnetic brake apparatus.

2. In an electric braking system, the combination of a propelling-motor adapted to be driven as a generator by the momentum of the vehicle, its armature-circuit, electromagnetic brake apparatus included therein, another circuit including the field, an electromagnetic controller actuated by current in the armature-circuit and means whereby such controller varies the current in the circuit including the field as the speed of the vehicle varies, to control the current in the electromagnetic brake apparatus.

3. In an electric braking system, the combination of a propelling-motor adapted to be driven as a generator by the momentum of the vehicle, its armature-circuit, electromagnetic brake apparatus included therein, a shunt on the armature-circuit including the field of the generator, a controlling device actuated by current in the armature-circuit and means whereby said controller varies the current in the shunt including the field to thereby control the current in the electromagnetic brake apparatus as the speed of the vehicle varies.

4. In an electric braking system, a car or vehicle having two propelling-motors adapted to be driven as generators by the momentum of the vehicle, the armature-circuits thereof, electromagnetic brake apparatus in each armature-circuit, derived circuits on the two armature-circuits, that on each armature-circuit including the field of the other generator, and a reverse-switch adapted to change the direction of rotation of the motors.

5. In an electric braking system, a car or vehicle having two propelling-motors adapted to be driven as generators by the momentum of the vehicle, the armature-circuits thereof, electromagnetic brake apparatus in both armature-circuits, derived circuits on the two armature-circuits, that on each armature-circuit including the field of the other generator, a reverse-switch adapted to change the direction of rotation of the motors and means for automatically varying the current in the field as the speed of the vehicle varies to control the current in the electromagnetic brake apparatus.

6. In an electric braking system, a car or vehicle having two propelling-motors adapted to be driven as generators by the momentum of the vehicle, the armature-circuits thereof, electromagnetic brake apparatus in both armature-circuits, derived circuits on the two armature-circuits, that on one armature-circuit including the field of the other generator, a reverse-switch adapted to change the direction of rotation of the motors and an electromagnetic controlling device operated by current in the armature-circuits and means whereby said controller varies the current in the fields as the speed of the car varies to control the current in the electromagnetic brake apparatus in both armature-circuits.

7. In an electric braking system, the combination of two propelling-motors adapted to be driven as generators by the momentum of the vehicle, a running controller or power-switch adapted to connect and disconnect the motors from the trolley-circuit and regulate their speed, a reversing-switch and connections for reversing the direction of rotation of the motors, the armature-circuit of the generators, electromagnetic brake apparatus included in each armature-circuit, derived circuits from each armature-circuit, that on the circuit of the armature of one generator including the field of the other generator and a brake-switch for throwing the braking system into operation irrespective of the position of the reverse-switch, the power-switch or the direction of travel of the vehicle.

8. In an electric braking system, the combination of two propelling-motors adapted to be driven as generators by the momentum of the vehicle, a running controller or power-switch adapted to connect and disconnect the motors from the trolley-circuit and regulate their speed, a reversing-switch and connections for reversing the direction of rotation of the motors, the armature-circuits of the generators, electromagnetic brake apparatus included in each armature-circuit, derived circuits from each armature-circuit that on the circuit of the armature of one generator including the field of the other generator, means for automatically varying the current in the field-circuits as the speed of the vehicle varies and a brake-switch for throwing the braking system into operation irrespective of the position of the reverse-switch, the power-switch or the direction of travel of the vehicle.

9. In an electric braking system, the combination of two propelling-motors adapted to be driven as generators by the momentum of the vehicle, a running controller or power-switch adapted to connect and disconnect the motors from the trolley-circuit and regulate their speed, a reversing-switch and connections for reversing the direction of rotation of the motors, the armature-circuits of the generators, electromagnetic brake apparatus included in each armature-circuit, derived circuits from each armature-circuit, that on the circuit of the armature of one generator including the field of the other generator, an electromagnetic controlling device included in both armature-circuits, means whereby said controller varies the current in the fields as the speed of the car varies, and a brake-switch for throwing the braking system into operation irrespective of the position of the reverse-switch, the power-switch or the direction of travel of the vehicle.

10. In an electric braking system, the combination of a propelling-motor adapted to be operated as a generator by the momentum of the vehicle, a braking-circuit including the armature of the motor, winding of electromagnetic braking apparatus included in said circuit, winding of the electromagnetic braking apparatus in the field-circuit of the motor and means for varying the current in the field as the speed of the car varies to thereby control the braking operation.

11. In an electric braking system, the combination of a propelling-motor adapted to be operated as a generator by the momentum of the vehicle, a braking-circuit including the armature of the motor, winding of electromagnetic braking apparatus included in said circuit, winding of the electromagnetic braking apparatus in the field-circuit of the motor, an electromagnetic controlling device included in the brake-circuit and actuated by current therein and means whereby such controller varies the current in the field to thereby control the braking operation.

12. In an electric braking system, the combination of a propelling-motor adapted to be driven as a generator by the momentum of the car, electromagnetic brake apparatus comprising several distinct windings part of which are included in the braking-circuit including the armature of the motor, and part of which are included in the trolley-circuit, and electrical connections whereby the current in the armature-circuit of the generator opposes the current from the trolley.

13. In an electric braking system, the combination of a propelling-motor adapted to be driven as a generator by the momentum of the car, electromagnetic brake apparatus comprising several distinct windings part of which are included in the braking-circuit including the armature of the motor, and part of which are included in the trolley-circuit, and electrical connections whereby the current in the armature-circuit of the generator opposes the current from the trolley, and electromagnetic means included in the armature-circuit for varying the current in the motor-field of the generator to thereby control the braking operation.

14. In an electric braking system, the combination of a propelling-motor adapted to be driven as a generator by the momentum of the car, electromagnetic brake apparatus comprising several distinct windings part of which are included in the braking-circuit including the armature of the motor, part of which windings is included in the trolley-circuit, and part of which windings is included in the field-circuit of the generator, electrical connections whereby the current in the armature-circuit of the generator opposes the current from the trolley, and electromagnetic means included in the armature-circuit for varying the current in the motor-field of the generator to thereby control the braking operation.

15. In an electric braking system, the combination of a propelling-motor adapted to be driven as a generator by the momentum of the car, an electromagnetic brake apparatus having multiple windings part of which is included in a braking-circuit taking current from the trolley, and part of which is included in the armature-circuit of the motor, an electromagnetic controller having multiple windings one winding being included in the trolley braking-circuit and the other winding in the armature braking-circuit and means whereby said controller varies the current in the field of the generator as the speed of the car varies, the organization and operation of the automatic controlling device being such that the energy in the several braking-circuits is controlled by the controlling device to effect the braking operation relatively to the speed of the car and irrespective of the voltage of the trolley.

16. In an electric braking system, the combination of a propelling-motor adapted to be driven as a generator by the momentum of the car, an electromagnetic brake apparatus having multiple windings part of which is included in a braking-circuit taking current from the trolley, part in the armature-circuit of the motor and part in the field-circuit of the generator, an electromagnetic controller having multiple windings one winding being included in the trolley braking-circuit and the other winding in the armature braking-circuit and means whereby said controller varies the current in the field of the generator as the speed of the car varies, the organization and operation of the automatic controlling device being such that the energy in the several braking-circuits is controlled by the controlling device to effect the braking operation relatively to the speed of the car and irrespective of the voltage of the trolley.

17. In an electric braking system, the combination of a propelling-motor adapted to be driven as a generator by the momentum of the car, an electromagnetic brake apparatus having multiple windings part of which are included in a braking-circuit taking current from the trolley, and part in the armature-circuit of the motor, an electromagnetic controller having multiple windings one winding being included in the trolley braking-circuit and the other winding in the armature braking-circuit and means whereby said controller varies the current in the field of the generator as the speed of the car varies, the organization and operation of the automatic controlling devices being such that the energy in the several braking-circuits is controlled by the controlling device to effect the braking operation relatively to the speed of the car and irrespective of the voltage of the trolley, and brake-switch devices and circuit connections whereby in the different positions of such switch devices the action of the automatic controlling device is regulated to vary the braking action at the will of the operator.

18. In an electric braking system, the combination of a propelling-motor adapted to be driven as a generator by the momentum of the car, an electromagnetic brake apparatus having multiple windings part of which is included in a braking-circuit taking current from the trolley, part in the armature-circuit of the motor and part in the field-circuit of the generator, an electromagnetic controller having multiple windings one winding being included in the trolley braking-circuit and the other winding in the armature braking-circuit and means whereby said controller varies the current in the field of the generator as the speed of the car varies, the organization and operation of the automatic controlling device being such that the energy in the several braking-circuits is controlled by the controlling device to effect the braking operation relatively to the speed of the car and irrespective of the voltage of the trolley, and brake-switch devices and circuit connections whereby in the different positions of such switch devices the action of the automatic controlling device is regulated to vary the braking action at the will of the operator.

19. In an electric braking system, the combination of a propelling-motor adapted to be driven as a generator by the momentum of the vehicle, an electromagnetic brake apparatus, winding of which is included in the armature-circuit of the generator, a second circuit including the field of the generator, an automatic controlling device included in the armature-circuit and acting to vary the current in the field and thereby control the braking operation as the speed of the car varies, brake-switch devices for initiating the braking operation and regulating the automatic controlling device to thereby control the braking operation, brake-pressure-retaining devices normally tending to retain the pressure between the braking-surfaces, an electromagnetic release device actuated by current from the armature-circuit during the braking operation and acting, during the braking operation, to hold the pressure-retaining devices out of operation, and circuit connections controlled by the brake-switch devices whereby the electromagnetic release devices may be energized by current in the trolley after the braking operation is completed to release the brake-pressure then retained by said pressure-retaining devices.

20. In an electric braking system, the combination of a propelling-motor adapted to be driven as a generator by the momentum of the car, electromagnetic brake apparatus having at least two windings, brake-switch devices and circuit connections whereby, on the actuation of said devices to initiate the braking operation, the motors are disconnected from the trolley, a winding of the brake apparatus is included in the circuit of the trolley and a winding of the brake apparatus included in the circuit with the armature of the generator, and a shunt around the brake apparatus including the field of the generator.

21. In an electric braking system, the combination of a propelling-motor adapted to be driven as a generator by the momentum of the car, electromagnetic brake apparatus having at least two windings, brake-switch devices and circuit connections whereby, on the actuation of said devices to initiate the braking operation, the motors are disconnected from the trolley, a winding of the brake apparatus is included in the circuit of the trolley and a winding of the brake apparatus included in the circuit with the armature of the generator, a shunt around the brake apparatus including the field of the generator, an electromagnetic controlling device actuated by current from the armature-circuit acting to vary the current in the field of the generator to thereby control the braking operation as the speed of the car varies.

22. In an electric brake apparatus, the combination of a propelling-motor adapted to be driven as a generator by the momentum of the car, an electromagnetic brake-controller having at least two windings, brake-switch devices and circuit connections whereby on the initiation of the braking operation the motors are disconnected from the trolley, a trolley-circuit is completed through one of the windings of the brake apparatus and through one of the windings of the automatic controller, the other winding of the brake apparatus and of the automatic controller connected in the circuit of the armature of the motor, a circuit including the field of the generator in shunt around the brake-apparatus winding included in the armature-circuit, and means whereby the automatic controller acts to vary the current in the field of the generator to thereby control the braking operation.

23. In an electric brake apparatus, the combination of a propelling-motor adapted to be driven as a generator by the momentum of the car, an electromagnetic brake apparatus having three windings, an electromagnetic controller having two windings, brake-switch devices and circuit connections whereby on the initiation of the braking operation the motors are disconnected from the trolley, a trolley-circuit is completed through one of the windings of the brake apparatus and through one of the windings of the automatic controller, the second windings of the brake apparatus and of the automatic controller connected in the circuit of the armature of the motor, and a circuit including the third winding of the brake apparatus and the field of the generator completed in shunt around the brake-apparatus winding that is included in the armature-circuit, and means whereby the automatic controller acts to vary the current in the field of the generator to thereby control the braking operation.

24. In an electric brake system, the combination with the braking-circuit and brake apparatus of a circuit-controlling device for regulating the braking operation comprising a winding, a fixed pole-piece extending within the winding and having a cavity therein conforming to the frustum of a cone and an opening extending from the bottom of such cavity through the pole-piece, an armature or plunger reciprocal within the winding and having a conical end of the same taper or angle as the cavity in the pole-piece and the point or end of which is adapted to enter the opening extending through the pole-piece, contact-brushes carried by the reciprocating armature, a series of insulated contacts in contact with which they travel, a variable resistance controlled by the brushes and contacts, and an adjustable spring opposing the entrance of the armature within the winding.

25. In an electric brake system, the combination with the braking-circuit and brake apparatus of a circuit-controlling device comprising a winding, a fixed pole-piece extending within the winding and having a cavity therein conforming to the frustum of a cone and an opening extending from the bottom of such cavity through the pole-piece, an armature or plunger reciprocal within the winding and having a conical end of the same taper or angle as the cavity in the pole-piece and the point or end of which is adapted to enter the opening extending through the pole-piece, contact-brushes carried by the reciprocating armature, a series of insulated contacts in contact with which they travel, a variable resistance controlled by the brushes and contacts, and an adjustable compression-spring opposing the entrance of the armature within the winding.

26. In an electric brake system, the combination of a propelling-motor adapted to be operated as a generator by the momentum of the vehicle, a braking-circuit supplied by current from the motor when so driven, an electromagnetic brake-applying apparatus contained in the braking-circuit and comprising a winding and shell of magnetic metal inclosing it, a pole-piece projecting within the winding and having through it an opening with inclined walls, an armature reciprocal within the winding and having its inner end tapered to conform to the taper of the opening in the pole-piece and of such length as to extend through and beyond such opening when the armature is in its forward position.

28. In an electric brake system, the combination of a propelling-motor adapted to be operated as a generator by the momentum of the vehicle, a braking-circuit supplied by current from the motor when so driven, an electromagnetic brake-applying apparatus contained in the braking-circuit and comprising a winding and shell of magnetic metal inclosing it, a pole-piece projecting within the winding and having through it an opening with inclined walls, an armature reciprocal within the winding and having its inner end tapered to conform to the taper of the opening in the pole-piece and of such length as to extend through and beyond such opening when the armature is in its forward position and means for automatically regulating the current in the braking-circuit as the speed of the car varies to thereby control the braking operation.

28. In an electric brake system, the combination of a propelling-motor adapted to be operated as a generator by the momentum of the vehicle, a braking-circuit supplied by current from the motor when so driven, an electromagnetic brake-applying apparatus contained in the braking-circuit and comprising a winding and a shell of magnetic metal inclosing it, a pole-piece projecting within the winding and having through it an opening with inclined walls, an armature reciprocable within the winding and having its inner end tapered to conform to the taper of the opening in the pole-piece but of such length as to extend through and beyond it, a wedge-block, a roller interposed between it and the side of the armature, a spring device normally urging the roller out of engagement with the inclined face of the wedge-block, and means for forcing the wedge-block against the roller to thereby lock or retain the armature in any position to which it may be attracted.

29. In an electric brake system, the combination of a propelling-motor adapted to be operated as a generator by the momentum of the vehicle, a braking-circuit supplied by current from the motor when so driven, an electromagnetic brake-applying apparatus contained in the braking-circuit and comprising a winding and a shell of magnetic metal inclosing it, a pole-piece projecting within the winding and having through it an opening with inclined walls, an armature reciprocable within the winding and having its inner end tapered to conform to the taper of the opening in the pole-piece but of such length as to extend through and beyond it, a wedge-block, a roller interposed between it and the side of the armature, a spring device normally urging the roller out of engagement with the inclined face of the block, a rocking shaft carrying a cam bearing on the wedge-block, a spring tending to force the wedge-block down on the roller and an electromagnet also included in the circuit of the motor-generator acting in opposition to the spring.

30. In an electric brake system, the combination of a propelling-motor adapted to be operated as a generator by the momentum of the vehicle, a braking-circuit supplied by current from the motor when so driven, an electromagnetic brake-applying apparatus contained in the braking-circuit and comprising a winding, an armature reciprocable within the winding, a wedge-block, a locking-roll interposed between it and the armature, means for normally urging the inclined face of the block against the roll to lock the armature in its attracted position, and means operated by current from the motor-generator for releasing the pressure of the block upon the roll to permit retraction of the armature.

31. In an electric braking system, the combination of a propelling-motor adapted to be driven as a generator by the momentum of a vehicle, its armature-circuit, electromagnetic brake apparatus included therein, another circuit including the field, an electromagnetic controller actuated by the current in the armature-circuit, means whereby such controller varies the current in the circuit including the motor-field as the speed of the vehicle varies and means normally tending to retain the braking pressure established by the electromagnetic brake apparatus and an electromagnetic releasing device energized by current delivered by the motor-generator and normally tending to hold said pressure-retaining devices out of operation.

32. In an electric braking system, a car or vehicle having two propelling-motors adapted to be driven as generators by the momentum of the vehicle, the armature-circuits thereof, electromagnetic brake apparatus in both armature-circuits, derived circuits on the two armature-circuits, that on each armature-circuit including the field of the other generator, a reverse-switch adapted to change the direction of rotation of the motors and means for automatically varying the current in the field as the speed of the vehicle varies to control the current in the electromagnetic brake apparatus and means normally tending to retain the braking pressure established by the electromagnetic brake apparatus and an electromagnetic releasing device energized by current delivered by the motor-generator and normally tending to hold said pressure-retaining devices out of operation.

33. In an electric braking system, the combination of a propelling-motor adapted to be operated as a generator by the momentum of the vehicle, a braking-circuit including the armature of the motor, winding of electromagnetic braking apparatus included in said circuit, winding of the electromagnetic braking apparatus in the field-circuit of the motor, an electromagnetic controlling device included in the brake-circuit and actuated by current therein and means whereby such controller varies the current in the field to thereby control the braking operation, and means normally tending to retain the braking pressure established by the electromagnetic brake apparatus and an electromagnetic releasing device energized by current delivered by the motor-generator and normally tending to hold said pressure-retaining devices out of operation.

34. In an electric braking system, the combination of a propelling-motor adapted to be driven as a generator by the momentum of the car, electromagnetic brake apparatus comprising several distinct windings part of which are included in the braking-circuit including the armature of the motor, part of which windings is included in the trolley-circuit, and part of which windings is included in the field-circuit of the generator, electrical connections whereby the current in the armature-circuit of the generator opposes the current from the trolley, and electromagnetic means included in the armature-circuit for varying the current in the motor-field of the generator to thereby control the braking operation and means normally tending to retain the braking pressure established by the electromagnetic brake apparatus and an electromagnetic releasing device energized by current delivered by the motor-generator and normally tending to hold said pressure-retaining devices out of operation.

35. In an electric braking system, the combination of a propelling-motor adapted to be driven as a generator by the momentum of the vehicle, its armature-circuit, electromagnetic brake apparatus included therein, another circuit including the field, an electromagnetic controller actuated by current in the armature-circuit and means whereby such controller varies the current in the circuit including the field as the speed of the vehicle varies, to control the current in the electromagnetic brake apparatus, and brake-switch devices and circuit connections whereby in the different positions of such switch devices the action of the automatic controlling device is regulated to vary the braking action at the will of the operator.

36. In an electric braking system, a car or vehicle having two propelling-motors adapted to be driven as generators by the momentum of the vehicle, the armature-circuits thereof, electromagnetic brake apparatus in both armature-circuits, derived circuits on the two armature-circuits, that on one armature-circuit including the field of the other generator, a reverse-switch adapted to change the direction of rotation of the motors and an electromagnetic controlling device operated by current in the armature-circuits and means whereby said controller varies the current in the fields as the speed of the car varies to control the current in the electromagnetic brake apparatus in both armature-circuits, and brake-switch devices and circuit connections whereby in the different positions of such switch devices the action of the automatic controlling device is regulated to vary the braking action at the will of the operator.

In testimony whereof I have hereunto subscribed my name.

JOSEPH N. MAHONEY.

Witnesses:
CLARENCE M. LEWIS,
WILLIAM A. STAHLIN.